United States Patent
Mishra et al.

(10) Patent No.: US 9,819,618 B2
(45) Date of Patent: Nov. 14, 2017

(54) RANKING RELEVANT DISCUSSION GROUPS

(71) Applicant: Microsoft Corporation, Redmond, WA (US)

(72) Inventors: Nina Mishra, Pleasanton, CA (US); Abhimanyu Das, Sunnyvale, CA (US); Krishnaram Kenthapadi, Sunnyvale, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 255 days.

(21) Appl. No.: 14/307,912

(22) Filed: Jun. 18, 2014

(65) Prior Publication Data
US 2015/0370797 A1    Dec. 24, 2015

(51) Int. Cl.
*G06F 17/30*    (2006.01)
*H04L 12/58*    (2006.01)
(Continued)

(52) U.S. Cl.
CPC ...... *H04L 51/046* (2013.01); *G06F 17/30867* (2013.01); *G06Q 50/01* (2013.01);
(Continued)

(58) Field of Classification Search
CPC ................ G06C 50/01; G06F 17/3053; G06F 17/30867; G06F 17/30864; G06F 17/2785;
(Continued)

(56) References Cited

U.S. PATENT DOCUMENTS 7,185,065 B1 *   2/2007   Holtzman ........... G06F 17/2745
                                                      705/36 R
7,925,743 B2 *   4/2011   Neely ............... G06F 17/30864
                                                      709/203
(Continued)

FOREIGN PATENT DOCUMENTS

KR   10-2013-0116231 A   10/2013
WO      2009/076555 A2    6/2009

OTHER PUBLICATIONS

Gori, et al., "ItemRank: A Random-Walk Based Scoring Algorithm for Recommender Engines", In Proceedings of the International Joint Conference on Artifical Intelligence, Jan. 1, 2007, pp. 2766-2771.

(Continued)

*Primary Examiner* — Dangelino Gortayo
(74) *Attorney, Agent, or Firm* — Jonathan M. Waldman

(57) ABSTRACT

Messages are collected and processed to determine topic identifiers that correspond to discussion groups. Queries are received and multiple discussion groups that are relevant to the query are determined based on the messages that are associated with the discussion groups and the topic identifiers associated with the discussion groups. The relevant discussion groups are ranked using a group preference model that simulates the behavior of a hypothetical seeker that considers discussion groups by selecting a message author who is an authority in a particular group, and exploring the discussion groups that are preferred by the selected author. The behavior of the seeker is simulated using a stationary Markov process and is used to generate a probability distribution that is used to rank the relevant discussion groups. The ranked relevant discussion groups are provided in response to the query.

20 Claims, 8 Drawing Sheets

(51) Int. Cl.
  *G06Q 50/00* (2012.01)
  *G06Q 30/02* (2012.01)
(52) U.S. Cl.
  CPC .... *G06F 17/3053* (2013.01); *G06F 17/30598* (2013.01); *G06F 17/30699* (2013.01); *G06F 17/30864* (2013.01); *G06Q 30/02* (2013.01)
(58) Field of Classification Search
  CPC ........ G06F 17/30699; G06F 17/30029; G06F 17/30598
  USPC ........ 707/748, 723, 751, 732, 736, 706, 733
  See application file for complete search history.

(56) References Cited

U.S. PATENT DOCUMENTS

| | | | |
|---|---|---|---|
| 8,126,882 B2* | 2/2012 | Lawyer | G06Q 10/063 705/7.11 |
| 8,185,515 B2* | 5/2012 | Lavine | G06F 17/30477 707/710 |
| 8,275,769 B1* | 9/2012 | Suh | G06Q 10/101 705/319 |
| 8,375,024 B2* | 2/2013 | Goeldi | G06Q 10/00 707/709 |
| 8,572,094 B2 | 10/2013 | Luo et al. | |
| 8,606,792 B1* | 12/2013 | Jackson | G06F 17/30699 707/748 |
| 8,645,396 B2 | 2/2014 | McNally et al. | |
| 8,793,255 B1* | 7/2014 | Bilinski | G06F 17/30867 707/740 |
| 8,843,528 B1* | 9/2014 | Behforooz | G06F 17/3053 707/803 |
| 8,965,883 B2* | 2/2015 | Si | G06F 17/30864 707/723 |
| 9,270,749 B2* | 2/2016 | Kanjirathinkal | H04L 67/104 |
| 9,342,624 B1* | 5/2016 | Ojha | G06Q 10/10 |
| 9,380,073 B2* | 6/2016 | Zent | H04L 63/20 |
| 2007/0198510 A1 | 8/2007 | Ebanks | |
| 2010/0287368 A1* | 11/2010 | Shuster | G06F 15/16 713/150 |
| 2011/0252044 A1 | 10/2011 | Shin | |
| 2012/0215773 A1 | 8/2012 | Si et al. | |
| 2013/0086030 A1 | 4/2013 | De Filippi | |
| 2013/0124257 A1* | 5/2013 | Schubert | G06Q 30/02 705/7.29 |

OTHER PUBLICATIONS

Jamali, et al., "TrustWalker: A Random Walk Model for Combining Trust-based and Item-based Recommendation", In Proceedings of the 15th ACM SIGKDD International Conference on Knowledge Discovery and Data Mining, Jun. 28, 2009, pp. 397-405.
"LinkedIn Search Relevance—People Search", Retrieved on: Mar. 26, 2014, Available at: http://help.linkedin.com/app/answers/detail/a_id/4447/~/linkedin-search-relevence---people-search.
Backstrom, et al., "Group Formation in Large Social Networks: Membership, Growth, and Evolution", In Proceedings of the 12th ACM SIGKDD International Conference on Knowledge Discovery and Data Mining, Aug. 20, 2006, pp. 44-54.
Backstrom, et al., "Preferential Behavior in Online Groups", In Proceedings of International Conference on Web Search and Data Mining, Feb. 11, 2008, pp. 117-127.
Brin, et al., "The Anatomy of a Large-Scale Hypertextual Web Search Engine", In Computer Networks and ISDN Systems, vol. 30, Issue 1-7, Apr. 1, 1998, pp. 107-117.
Budak, et al., "On Participation in Group Chats on Twitter", In Proceedings of 22nd International Conference on World Wide Web, May 13, 2013, pp. 165-175.
Butler, Brian S., "Membership Size, Communication Activity, and Sustainability: A Resource-Based Model of Online Social Structures", In Journal Information Systems Research, vol. 12, Issue 4, Dec. 2001, pp. 346-362.
Chien, et al., "Link Evolution: Analysis and Algorithms", In Internet Mathematics, vol. 1, No. 3, Jan. 2003, pp. 277-304.
Cook, et al., "Group Chats on Twitter", In Proceedings of 22nd International World Wide Web Conference, May 13, 2013, 11 Pages.
Mizil, et al., "No Country for Old Members: User Lifecycle and Linguistic Change in Online Communities", In Proceedings of 22nd International World Wide Web Conference, May 13, 2013, pp. 307-317.
Ehrlich, et al., "Searching for Experts in the Enterprise: Combining Text and Social Network Analysis", In Proceedings of International ACM Conference on Supporting Group Work, Nov. 4, 2007, pp. 117-126.
Forsyth, Donelson R., "Group Dynamics", A Publication of Wadsworth Publishing Company, Mar. 19, 2009, 4 Pages.
Godin, et al., "Using Topic Models for Twitter Hashtag Recommendation", In Proceedings of 22nd International Conference on World Wide Web Companion, May 13, 2013, pp. 593-596.
Leong, et al., "Predicting Preference Flips in Commerce Search", In Proceedings of the 29th International Conference on Machine Learning, Jun. 26, 2006, 8 Pages.
Iriberri, et al., "A Life-Cycle Perspective on Online Community Success", In Journal ACM Computing Surveys, vol. 41, Issue 2, Feb. 2009, pp. 11:1-11:29.
Jeh, et al., "Scaling Personalized Web Search", In Proceedings of 12th International Conference on World Wide Web, May 20, 2003, pp. 271-279.
Jiao, et al., "ExpertRank: An Expert User Ranking Algorithm in Online Communities", In International Conference on New Trends in Information and Service Science, Jun. 30, 2009, pp. 674-679.
Johnson, et al., "Neo-Tribes: The Power and Potential of Online Communities in Health Care", In Magazine Communications of the ACM, vol. 49, Issue 1, Jan. 2006, pp. 107-113.
Jones, et al., "Information Overload and the Message Dynamics of Online Interaction Spaces: A Theoretical Model and Empirical Exploration", In Journal Information Systems Research, vol. 15, Issue 2, Apr. 2004, pp. 194-210.
Joyce, et al., "Predicting Continued Participation in Newsgroups", In Journal of Computer-Mediated Communication, vol. 13, No. 3, Apr. 2006, 27 Pages.
Kautz, et al., "Referral Web: Combining Social Networks and Collaborative Filtering", In Magazine Communications of the ACM, vol. 40, Issue 3, Mar. 1997, pp. 63-65.
Kleinberg, Jon M., "Authoritative Sources in a Hyperlinked Environment", In Proceedings of the Ninth Annual ACM-SIAM Symposium on Discrete Algorithms, Jan. 25, 1998, 32 Pages.
Kossinets, et al., "Empirical Analysis of an Evolving Social Network", In Science, vol. 311, Jan. 6, 2006, pp. 88-90.
Kywe, et al., "On Recommending Hashtags in Twitter Networks", In Proceedings of the 4th International Conference on Social Informatics, Dec. 5, 2012, 14 Pages.
Lampe, et al., "Follow the (Slash) Dot: Effects of Feedback on New Members in an Online Community", In Proceedings of International ACM SIGGROUP Conference on Supporting Group Work, Nov. 6, 2005, pp. 11-20.
Markus, M. Lynne, "Toward a "Critical Mass" Theory of Interactive Media Universal Access, Interdependence and Diffusion", In Communication Research, vol. 14, No. 5, Oct. 1987, pp. 491-511.
Page, et al., "The Pagerank Citation Ranking: Bringing Order to the Web", In Technical Report, Stanford University, Jan. 29, 1998, 17 Pages.
Reichling, et al., "Matching Human Actors based on their Texts: Design and Evaluation of an Instance of the ExpertFinding Framework", In Proceedings of International ACM SIGGROUP Conference on Supporting Group Work, Nov. 6, 2005, pp. 61-70.
Ren, et al., "A Simulation for Designing Online Community: Member Motivation, Contribution, and Discussion Moderation", In Proceedings of Information Systems Research, Jan. 2011, 41 Pages.
Sakai, Tetsuya, "On the Reliability of Information Retrieval Metrics based on Graded Relevance", In Journal Information Processing and Management, vol. 43, Issue 2, Mar. 2007, pp. 531-548.
Tversky, Amos, "Elimination by Aspects: A Theory of Choice", In Psychological Review, vol. 79, No. 4, Jul. 1972, 1 Page.

(56) References Cited

OTHER PUBLICATIONS

Harman, et al., "TREC: Experiment and Evaluation in Information Retrieval", In Publication of MIT Press, vol. 63, Sep. 2, 2005, 2 Pages.
Whittaker, et al., "The Dynamics of Mass Interaction", In Proceedings of Computer Supported Cooperative Work, Sep. 14, 2009, 4 Pages.
Yang, et al., "We Know What @You #Tag: Does the Dual Role Affect Hashtag Adoption?", In Proceedings of 21st International Conference on World Wide Web, Apr. 16, 2012, pp. 261-270.
Zangerle, et al., "Recommending #-Tags in Twitter", In Proceedings of the Workshop on Semantic Adaptive Social Jul. 15, 2011, 12 Pages.
U.S. Appl. No. 14/062,307, Das, et al., filed Oct. 24, 2013.
U.S. Appl. No. 13/872,175, Mishra, et al., filed Apr. 29, 2013.

\* cited by examiner

RANKING RELEVANT DISCUSSION GROUPS

BACKGROUND

A discussion group is a synchronized conversation using a messaging application such as Twitter™. For example, there currently are discussion groups related to health issues (diabetes, lupus, weight loss, postpartum depression, etc.), hobbies (movies, wine, skiing, photography, food, sports, cars, etc.), and education (elementary school teachers, college professors, thesis writing, etc.). Typically, participants in a discussion group agree on a topic identifier for the discussion group to use (e.g., a hashtag). The participants may then participate in the discussion group by following the topic identifier, and/or generating messages that include the topic identifier.

Discussion group may further include any set of messages related to a common topic. Examples of such groups may include a set of user generated online reviews related to a particular restaurant or product. In another example, a discussion group may be a thread or chain of comments related to a topic on an online message board, or comments associated with a particular article or blog posting.

While these discussion groups are useful for their participants, they may also be relevant or useful to users who have an interest in the topic that is discussed in the group. For example, a user who is researching a health issue may find the messages from a discussion group related to the health issue useful, or may wish to participate in the next scheduled discussion group. In another example, a restaurant may be interested in what users are saying about the restaurant in a discussion group related to local restaurants, or in comments associated with the restaurant on a website for providing restaurant reviews. However, there is no way to easily search for and identify relevant discussion groups for a particular topic or query, making it difficult for interested parties to be made aware of such groups or to make use of information provided in the discussion groups.

SUMMARY

Messages are collected and processed to determine topic identifiers that correspond to discussion groups. A query is received and multiple discussion groups that are relevant to the query are determined based on the messages that are associated with the discussion groups and the topic identifiers associated with the discussion groups. The relevant discussion groups are ranked using a group preference model that simulates the behavior of a hypothetical seeker that considers discussion groups by selecting a message author who is an authority in a particular group, and exploring the discussion groups that are preferred by the selected author. The behavior of the seeker is simulated using a stationary Markov process and is used to generate a probability distribution that is used to rank the relevant discussion groups. The ranked relevant discussion groups are provided in response to the query.

In an implementation, a query is received by a computing device. A plurality of discussion groups that are relevant to the query is determined by the computing device. Each discussion group is associated with a plurality of messages and each message is associated with an author. For each discussion group of the plurality of discussion groups, an authority score for each author associated with a message in the discussion group is determined by the computing device. For each author associated with a message, a preference score for the author for each discussion group of the plurality of discussion groups is determined by the computing device. The discussion groups of the plurality of discussion groups are ranked using the preference scores and the authority scores by the computing device.

In an implementation, a plurality of messages is received at a computing device. Each message includes a topic identifier and is associated with an author. Topic identifiers of the plurality of messages that represent discussion groups are determined by the computing device. A query is received at the computing device. Topic identifiers of the determined topic identifiers that are relevant to the received query are determined by the computing device. The determined topic identifiers are ranked based on the messages that include the determined topic identifiers by the computing device. The ranked determined topic identifiers are provided in response to the query by the computing device.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there is shown in the drawings example constructions of the embodiments; however, the embodiments are not limited to the specific methods and instrumentalities disclosed. In the drawings.

DETAILED DESCRIPTION

Figure 1:
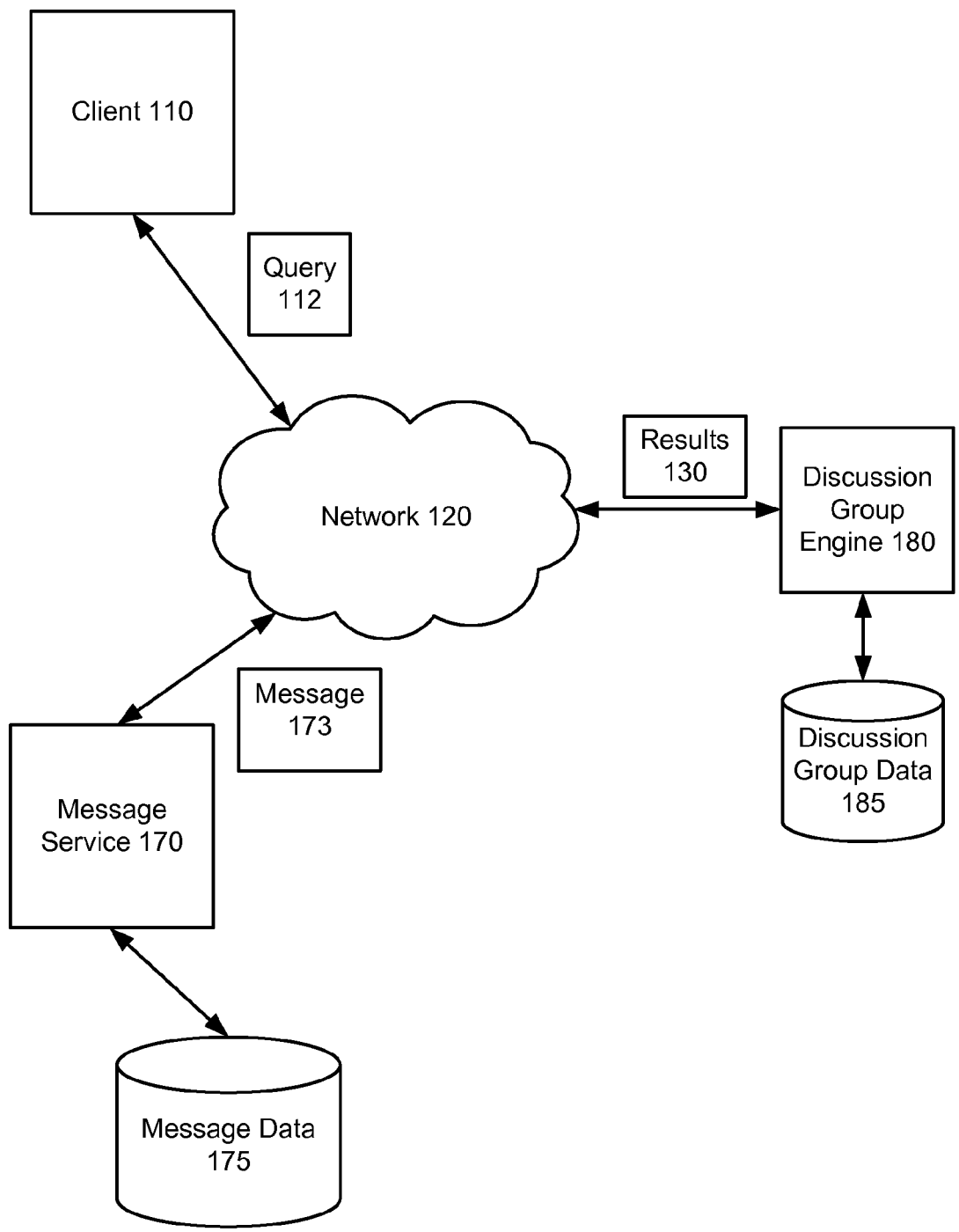
FIG. 1 is an illustration of an exemplary environment for identifying discussion groups that are relevant to a query, and for ranking the relevant discussion groups.

FIG. 1 is an illustration of an exemplary environment 100 for identifying discussion groups that are relevant to a query, and for ranking the relevant discussion groups. A client 110 may communicate with a message service 170 through a network 120. The client 110 may be configured to communicate with the message service 170 to access, receive, retrieve, and display media content and other information that may be associated with messages 173. The network 120 may be a variety of network types including the public switched telephone network (PSTN), a cellular telephone network, and a packet switched network (e.g., the Internet). Although one message service 170 is shown in FIG. 1, it is contemplated that the client 110 may be configured to communicate with multiple message services 170 through the network 120.

In some implementations, the client 110 may include a desktop personal computer, workstation, laptop, personal digital assistant (PDA), smart phone, cell phone, or any WAP-enabled device or any other computing device capable of interfacing directly or indirectly with the network 120. The client 110 may be implemented using one or more computing devices such as the computing device 800 illustrated in FIG. 8. The client 110 may run an HTTP client, e.g., a browsing program, such as MICROSOFT INTERNET EXPLORER or other browser, or a WAP-enabled browser in the case of a smart phone, cell phone, PDA, or other wireless device, or the like, allowing a user of the client 110 to access, process, and view messages 173 made available to it from the message service 170. Alternatively or additionally, the client 110 may run a specialized application that accesses information from the message service 170.

The message service 170 may be configured to provide a messaging application that allows users to generate messages 173 using a client 110. Typically each user of the message service 170 is assigned a user account identifier such as a word, phrase, or number. The user may then use the message service 170 to send messages 173 to specific user accounts, or may use the message service 170 to more broadly publish their messages 173 where other users can chose to view them. The messages 173 generated by the message service 170 may be stored and/or published as message data 175. The user account or user that generates a message 173 is referred to herein as the author of the message 173.

For example, a user may use the message service 170 to "follow" a particular user account, and may receive some or all of the messages 173 that are generated by the followed user account. In some implementations, users of the message service 170 may be able to search the messages 173 generated by users that include specific key words, or that were generated using specific user accounts. An example message service 170 may include Twitter™ and the messages 173 may include tweets™. Other message services 170 and/or message 173 types may be supported. Another example of a message service 170 may be a source for online reviews such as Amazon.com™ or Yelp™, or a commenting system such as Disqus™. The messages 173 may include text messages, audio messages, video messages, and combinations thereof.

Each message 173 may include some amount of text or characters. Depending on the implementation, the number of characters in each message 173 may be limited or may be effectively unlimited. For example, in some implementations each message 173 may be limited to 140 or fewer characters. In addition, each message 173 may be associated with a date. The date may be the approximate date and time on which the associated message 173 was generated or sent. Other types of data may be associated with, or part of a message 173. For example, messages 173 may include URLs, images, videos, and other media types.

Each message 173 may further include what is referred to herein as a topic identifier. A topic identifier may identify a topic, theme, or subject associated with the message 173 it appears in. Examples of topic identifiers include hashtags. Other types of topic identifiers may be used. A hashtag is a string of characters that begins with the pound sign ("#"). Authors may add a topic hashtag to a message 173 to indicate that it belongs to, or is associated with, the topic or subject associated with the hashtag. Thus, for example, in a message 173 about their dog's health, an author may add hashtags such as #dog, #pet, #veterinarian, etc.

Where the messages 173 are online reviews, the topic identifier may be an identifier of the thing (e.g., restaurant, product, or service) being reviewed. Where the messages 173 are part of an online discussion or message board, the topic identifier may be the subject of the particular thread, or an identifier of the article or post that is being discussed.

The message service 170 may allow users to search the message data 175 using the topic identifiers. For example, a user may query the message service 170 for all messages 173 that include the topic identifier #dog. The message service 170 may then return all messages 173 that include the topic identifier #dog. In addition, the message service 170 may also allow users to follow a particular topic identifier. Continuing the example above, a user may select to follow the topic identifier #dog. When a message 173 that includes the topic identifier #dog is generated by another user of the message service 170, the message 173 is provided to every user that follows the topic identifier #dog.

The use of topic identifiers in messages 173 may allow users to organize their messages 173 into what is referred to herein as a discussion group. In some implementations, during a discussion group, participants in the discussion group may send and receive messages 173 that include an agreed upon topic identifier at or around an agreed upon time. Each participant in the discussion group may then receive each message 173 that includes the agreed upon topic identifier during the discussion group, and may respond to one or more of the messages 173 creating a discussion. Typically, the discussion groups are held at a regular agreed upon time (e.g., once a week) and last for an agreed upon duration of time (e.g., one hour). In some instances, a discussion group may include an agreed upon user to act as a moderator and to highlight particular messages 173 that include the agreed upon topic identifier for the users of the discussion group to discuss. Alternatively, a discussion group may not have an agreed upon time or duration, but may be participated in merely by generating messages 173 for a particular website or in particular thread or comment chain. Discussion groups exist on a variety of topics including entertainment, health, finances, and sports, for example.

Depending on the implementation, a topic identifier may be associated with a discussion group if it is one or more of periodic, synchronous, and cohesive. Alternatively, any topic identifier may be associated with a discussion group regardless of whether or not it is periodic, synchronous, or cohesive.

A topic identifier may be periodic if the messages 173 associated with the topic identifier are generated or sent by authors according to a periodic schedule (e.g., every predetermined number of seconds, minutes, hours, etc.). The period may be hourly, daily, weekly, biweekly, monthly, etc. Other periods may be used.

A topic identifier may be synchronous if the messages 173 associated with the topic identifier are generated or sent by authors during a duration of time. This duration may be an hour, two hours, three hours, etc. Other durations may be used. For example, for a discussion group that has a period of one week and lasts an hour, the duration is one hour.

A topic identifier may be cohesive if some predetermined number or fraction of the messages 173 associated with the topic identifier represent communications between user accounts. For example, the topic identifier may be determined to be cohesive if at least about 20% of the messages 173 associated with the topic identifier are communications between user accounts. Other percentages may be used. In another example, the topic identifier may be cohesive if a threshold number of user account pairs that use the topic identifier communicated with each other using the topic identifier.

In order to allow users to search for and identify relevant discussion groups, and topic identifiers associated with the relevant discussion groups, the environment 100 may further include a discussion group engine 180. The discussion group engine 180 may receive message data 175 from the message service 170, and may identify topic identifiers that correspond to discussion groups. The identified topic identifiers that correspond to discussion groups, and the messages 173 that include the identified topic identifiers, may be stored by the discussion group engine 180 as the discussion group data 185.

In addition, the discussion group engine 180 may further receive one or more queries 112 from clients 110, and may identify discussion groups that are relevant to the queries 112. For example, the discussion group engine 180 may search for topic identifiers that include one or more terms of the query 112, or that include one or more terms that are known to be related to the query 112. Alternatively or additionally, the discussion group engine 180 may search for messages 173 that include one or more terms, or related terms, of the query 112, and may determine the topic identifiers associated with any matching messages 173 to be discussion groups that are related to the query 112. The relevant discussion groups may be identified and provided as results 130. Information such as when the identified discussion groups occur, and their duration may also be provided.

In some implementations, the discussion group engine 180 may also rank the relevant discussion groups according to what is referred to as the group preference model. The group preference model attempts to model how a hypothetical user (referred to as the seeker) would select relevant discussion groups from a set of discussion groups that are relevant to a query 112.

According to the group preference model, the seeker initially chooses a discussion group from the set of relevant discussion groups. The seeker then reviews some of the messages 173 associated with the discussion group and determines an author that appears to have some authority among the participants of the discussion group. Authority may be determined by the seeker based on the number of messages generated by the author or by the number of direct replies that the author receives. Other methods for determining or measuring authority may be used.

After selecting an author with high authority, the seeker may then determine other discussion groups that the selected author participates in or has a preference for. These groups may be other discussion groups from the set of relevant discussion groups. The discussion groups that the author participates in may be determined from a profile page associated with the author, or based on the messages 173 associated with the author. For example, an author may generate more messages 173 for discussion groups that the author has a high preference for than discussion groups that the author has a low preference for.

According to the group preference model, the seeker may then continuously alternate between authors and discussion groups as described above until the seeker ultimately selects a discussion group that they are satisfied with. After multiple iterations of the group reference model, the seeker may ultimately select multiple discussion groups of the relevant discussion groups forming a distribution. As described further with respect to FIG. 2, the distribution of discussion groups may be used by the discussion group engine 180 to rank the discussion groups that are relevant to the query 112.

Figure 2:
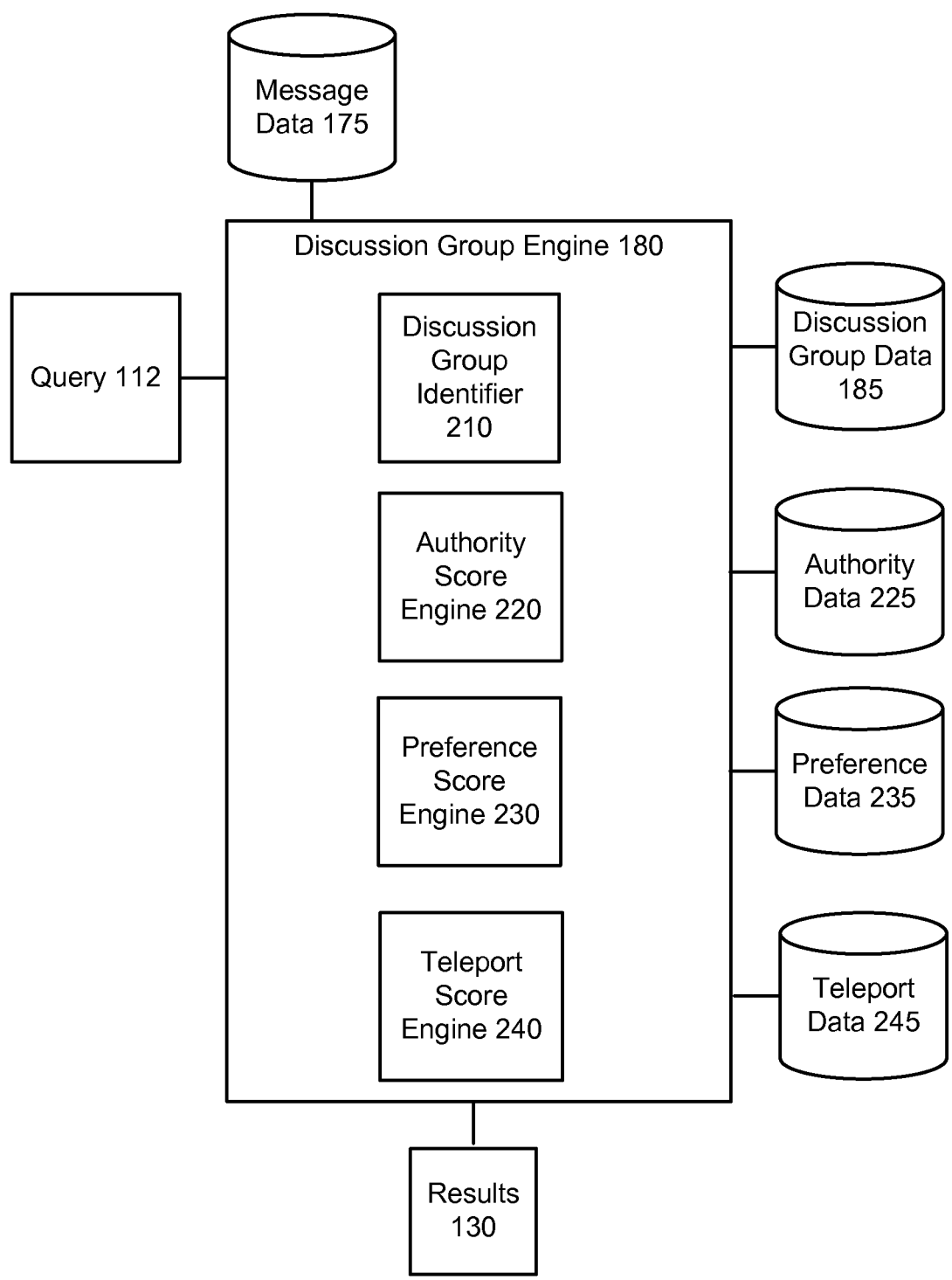
FIG. 2 is an illustration of an implementation of an exemplary discussion group engine.

FIG. 2 is an illustration of an implementation of an exemplary discussion group engine 180. The discussion group engine 180 may include several components including, but not limited to, a discussion group identifier 210, an authority score engine 220, a preference score engine 230, and a teleport score engine 240. More or fewer components may be supported. The discussion group engine 180 may be implemented using one or more computing devices such as the computing device 800 illustrated in FIG. 8.

The discussion group identifier 210 may receive message data 175 and may determine one or more topic identifiers that are likely to be associated with a discussion group. As described above, one of the characteristics of a discussion group is that it is periodic. In some implementations, the discussion group identifier 210 may extract the topic identifiers from the messages 173 that are included in the message data 175, and may consider whether each extracted topic identifier is periodic. Alternatively, the discussion group identifier 210 may receive a set of topic identifiers to consider. For example, a user or administrator may preselect a set of topic identifiers that may be associated with discussion groups, or the set of topic identifiers may be collectively identified.

The discussion group engine 180 may, for each topic identifier in the message data 175, determine if the topic identifier is periodic. The discussion group engine 180 may determine if a topic identifier is periodic by retrieving each message 173 associated with the topic identifier, and may determine if the topic identifier is periodic based on the times associated with each message 173. For example, the discussion group identifier 210 may look for times where the messages 173 are clustered or particularly dense, and may determine if the clusters repeat according to any discernable period. Any method for determining a period for a time ordered group of samples may be used.

The discussion group engine 180 may further determine whether the topic identifiers associated with the message data 175 are synchronous. As described above, another characteristic of discussion groups is that they are synchronous. A topic identifier is synchronous if most of the associated messages 173 occur during a fixed duration at some offset of the determined period. Thus, for example, a topic identifier is synchronous if most of the messages 173 occur during a one hour duration starting at 7 pm every week.

The discussion group engine 180 may determine whether the topic identifiers that have already been determined to be periodic are synchronous. The discussion group engine 180 may determine if a topic identifier is synchronous using the determined period for the topic identifier and the time associated with each message 173 that uses the topic identifier.

In some implementations, the discussion group engine 180 may determine if there is duration of time that includes most of the messages 173 with respect to the determined period. The discussion group engine 180 may consider several possible candidate durations (e.g., one hour, two hours, three hours, etc.) until a duration is determined that includes most of the generated messages 173. If a suitable duration is determined by the discussion group engine 180, the duration may be stored by the discussion group engine 180 with the topic identifier in the discussion group data 185.

The discussion group engine 180 may further determine whether the topic identifiers associated with the message data 175 are cohesive. As described above, another characteristic of discussion groups is that they are cohesive. A topic identifier is cohesive if some number or percentage of the messages 173 that include the topic identifier are messages 173 that are sent between user accounts. A distinguishing feature of discussion groups is that they are used to facilitate discussion among users. Therefore, a greater number of the messages 173 that are associated with a discussion group are likely to be addressed to particular user accounts associated with the discussion group (such as a moderator or other user accounts) than for messages 173 that are not associated with a discussion group.

The discussion group identifier 210 may determine whether the topic identifiers that have already been determined to be periodic and synchronous are cohesive. In some implementations, the discussion group identifier 210 may determine a topic identifier is cohesive based on a number of user account pairs that exchange messages 173 associated with the topic identifier. The number of user account pairs may be compared with a threshold number to determine if the topic identifier is cohesive. The threshold number may be set by a user or administrator, and may be based on the number of messages 173 associated with the topic identifier and/or the number of user accounts that use the topic identifier. Other methods for determining whether a topic identifier is cohesive may be used.

If the discussion group identifier 210 determines that topic identifier is cohesive, then the topic identifier may be stored in the discussion group data 185. The topic identifiers that were determined to be one or more of periodic, synchronous, and cohesive may be identified as discussion groups in the discussion group data 185.

In other implementations, any topic identifier may be considered a discussion group by the discussion group identifier 210 regardless of whether or not it is determined to be one or more of periodic, synchronous, and cohesive. For example, a topic identifier may be considered a discussion group when it is recommended by a user to the discussion group identifier 210, or has been used in a message 173 more than a threshold number of times. Thus, if a particular thing (e.g., item, service, product, topic, restaurant, movie, television show, etc.) that is being reviewed or discussed online has more than a threshold number of associated messages 173, then a topic identifier associated with the thing may be considered a discussion group by the discussion group identifier 210.

The discussion group engine 180 may receive a query 112 for a discussion group. The query 112 may include one or more terms that indicate a topic that a user is interested in finding one or more discussion groups to discuss or learn about. For example, a user may be interested in discussion groups related to toddlers, and may generate a query 112 that includes the term toddlers.

The discussion group engine 180 may search the discussion group data 185 for one or more discussion groups that are relevant to the query 112. Depending on the implementation, a discussion group may be relevant to the query 112 if its associated topic identifier includes a term of the query 112, or includes a known variation, synonym, or misspelling of a term of the query 112. Alternatively or additionally, a discussion group may be relevant to the query 112 if any of the messages 173 associated with the discussion group includes a term of the query 112, or includes a known variation, synonym, or misspelling of a term of the query 112. A message 173 may be associated with a discussion group if it includes the topic identifier (e.g., hashtag) associated with the discussion group.

After identifying a set of relevant discussion groups, the discussion group engine 180 may rank the relevant discussion groups, and may provide some or all of the relevant discussion groups according to the ranking as the results 130. As described above, in some implementations, the discussion group engine 180 may rank the relevant discussion groups using the group preference model. The discussion group engine 180 may apply the group preference model using some or all of authority scores, preference scores, and teleport scores computed for some of all of the relevant discussion groups.

The authority score engine 220 may compute an authority score for each author of a message 173 associated with a discussion group of the relevant discussion groups. Alternatively or additionally, the authority scores may be computed for each participant in a discussion group. Each author or participant may receive an authority score for each relevant discussion group that they are associated with. Thus, for example, an author who participates in a discussion group with a topic of #depression and a discussion group with a topic identifier of #therapy may receive a separate authority score by the authority score engine 220 for each discussion group.

How the authority score is calculated by the authority score engine 220 may depend on the implementation, and how much weight the concept of authority is given in the group preference model. In some implementations, the authority score for an author may be based on the number of followers that are associated with the author, and may be determined by the authority score engine 220 based on a profile associated with the author. The profile may be provided by the message service 170.

In other implementations, the authority score for an author may be based on the total number of messages 173 generated by the author in the particular discussion group, or may be based on the number of replies that the author receives in the discussion group. For example, the authority score engine 220 may count the number of times that the author's user name appears in a message 173 that also include the topic identifier associated with the discussion group.

In implementations where the authority score is given little weight, the authority score engine 220 may assign the same authority score to each author in a discussion group regardless of the number of messages 173 associated with the author, or the number of followers that the author has. Other techniques for scoring the authority of an author or participant based on messages 173 may be used.

In another implementation, the authority score for an author with respect to a topic identifier may be determined using what is referred to herein as "noun-frequency." In such an implementation, the authority score for an author may be based on a count of how many messages 173 associated with the author include both a received query 112 and the topic identifier.

In another implementation, the authority score for an author with respect to a topic identifier may be determined using what is referred to herein as "mention weights." In such an implementation, the authority score for an author may be based on a count of how many times that the author is mentioned in a message 173 that includes both a received query 112 and the topic identifier.

The computed authority scores for each author or participant may be stored by the authority score engine 220 as the authority data 225. The authority data 225 for a discussion group may form a distribution of authority scores across all authors and participants of the discussion group.

The preference score engine 230 may compute a preference score for each author or participant associated with a discussion group of the relevant discussion groups. The preference score for a participant or author for a discussion group may represent how much the author or participant likes or prefers the particular discussion group. Each author or participant may receive a preference score for each discussion group of the relevant discussion groups.

In some implementations, the preference score for an author or participant for a discussion group may be proportional to the total number of times the participant or author participated in the discussion group. For example, if the participant participated in #therapy one hundred times and #depression thirty times, the preference score for #therapy may be larger than the preference score for #depression. The data used to determine which discussion groups that a user participated in may be part of the message data 175, for example.

Alternatively or additionally, the preference score may be based on the number of messages 173 that the author created or generated. Regardless of the method used to generate preference scores, the sum of the preference scores generated for an individual author or participant by the preference score engine 230 across all discussion groups of the relevant discussion groups may equal one.

In some implementations, the group preference scores may be computed using a transition probability matrix. A transition probability matrix for (query 112, author) pairs are calculated. The matrix includes transition edge probabilities for each author and query 112 and each pair of topic identifiers (e.g., h1 and h2). The transition edge probability represents the author's preference for the topic identifier h1 over h2 for the query 112. When computing the author's preference between h1 and h2, only messages 173 associated with a time-period when the author was "aware" of both of the topic identifiers may be considered. For this time-period, a number of meetings of h1 and h2 attended by the author that are responsive to the given query 112 are determined. The transition probability may then be determined based on the relative differences between the numbers of each group discussion attended by the author.

The computed preference scores for each author or participant may be stored by the preference score engine 230 as the preference data 235. Similar to the authority scores, the preference data 235 for the discussion groups may form a probability distribution of preference scores across all authors and participants of the discussion groups.

With respect to the group preference model described above, the computed authority scores may be used by the discussion group engine 180 to determine which author to follow from a selected discussion group of the relevant discussion groups, and the determined preference scores may be used by the discussion group engine to select the discussion group that is preferred by the followed author. In particular, the discussion group engine 180 may use the probability distributions from the authority data 225 and the preference data 235 to determine the probability that each discussion group of the relevant discussion groups will be ultimately selected by a hypothetical seeker after applying the group preference model. The relevant discussion groups may then be ranked based on the probabilities associated with each discussion group.

In some implementations, the group preference model used by the discussion group engine 180 may further consider what is referred to herein as a teleport score for each of the relevant discussion groups. The teleport score represents the observation that when a hypothetical seeker as described above is exploring the relevant discussion groups by repeatedly selecting participants and discussion groups according to the authority and preference scores, at some point the seeker may abandon their exploration and may start over by selecting a new discussion group from the relevant discussion groups. The teleport score for a discussion group represents the likelihood that the discussion group will be the selected new discussion group. The seeker may then continue to consider authors and discussion groups as described above starting from the newly selected discussion group.

In such implementations, the discussion group engine 180 may further include a teleport score engine 240. The teleport score for a discussion group may represent the probability that the hypothetical seeker randomly decides to abandon their current exploration and selects the discussion group. In some implementations, the teleport score may be equal for all of the discussion groups in the set of relevant discussion groups, and may be calculated by the teleport score engine 240 based on the total number of discussion groups that are in the set of relevant discussion groups. For example, the teleport score engine 240 may calculate the teleport score for a discussion group as one divided by the total number of discussion groups in the set of discussion groups.

In other implementations, the teleport score engine 240 may calculate the teleport scores for the discussion groups based on how relevant each discussion group is to the query 112. For example, the teleport score engine 240 may calculate the teleport score for a discussion group based on the percentage of messages 173 that are associated with the discussion group that are also relevant to the query 112. Other methods for scoring based on relativity may be used. The computed teleport scores for each discussion group may be stored by the teleport score engine 240 as the teleport data 245.

The discussion group engine 180 may then implement the group preference model using the computed authority data 225, preference data 235, and teleport data 245 using the following process where $\lambda$ is a stopping probability. At a first step, the discussion group engine 180 may randomly or arbitrarily select a starting discussion group g from the set of discussion groups that are relevant to the query 112. The starting discussion group g may be randomly selected or may be selected based on the teleport score $D_q$ computed for the discussion group g for the query 112 q by the teleport score engine 240.

At a second step, the discussion group engine 180 may select an author or participant p associated with the discussion group g according to the probability distribution of the authority scores $A_{q,g}(p)$ computed by the authority score engine 220.

At a third step, the discussion group engine 180 may select a new discussion group g' from the set of discussion groups preferred by the selected author or participant p according to the probability distribution of the preference scores $P_{q,g}(g')$ computed for the relevant discussion groups by the preference score engine 230.

At a fourth step, the discussion group engine 180 may, with a probability $\lambda$, sample a discussion group g from the set of relevant discussion groups according to the probability distribution of the teleport scores $D_q$, and may return to the second step. Otherwise, the discussion group engine 180 may set g' to g, and may return to the second step.

Depending on the implementations, the discussion group engine 180 may execute the group preference model over many iterations, and may record the discussion group that is ultimately selected from the set of relevant discussion groups for each iteration. The records of which discussion groups are selected may be used by the discussion group engine 180 to rank the relevant discussion groups. For example, the discussion group that is most often selected may receive a highest rank, and the discussion group that is selected the least may receive a lowest rank.

In some implementations, the discussion group engine 180 may apply the group preference model described above using a stationary Markov process. The group preference model may be represented by a Markov process over the set of relevant discussion groups with transition probabilities $M_{g_1,g_2}(q)$ computed using the following formula (1) where n is the number of discussion groups in the set of relevant discussion groups and U is the set of authors or participants in any discussion group:

$$M_{g_1,g_2}(q) = \lambda D_g(g_2) + (1-\lambda)\Sigma_{p \in U} A_{q,g_1}(p) P_{q,p}(g_2) \quad (1)$$

In formula (1), each transition probability $M_{g_1,g_2}(q)$ is the probability that a seeker lands on the discussion group $g_2$ given that the last discussion group that they landed on was $g_1$.

The discussion group engine 180 may calculate the stationary distribution of the Markov process defined in the above formula 1 for a query 112 and a set of relevant discussion groups using the authority data 225, the preference data 235, and the teleport data 245. The discussion group engine 180 may then rank the discussion groups in the set of relevant discussion groups using the calculated stationary distribution.

Figure 3:
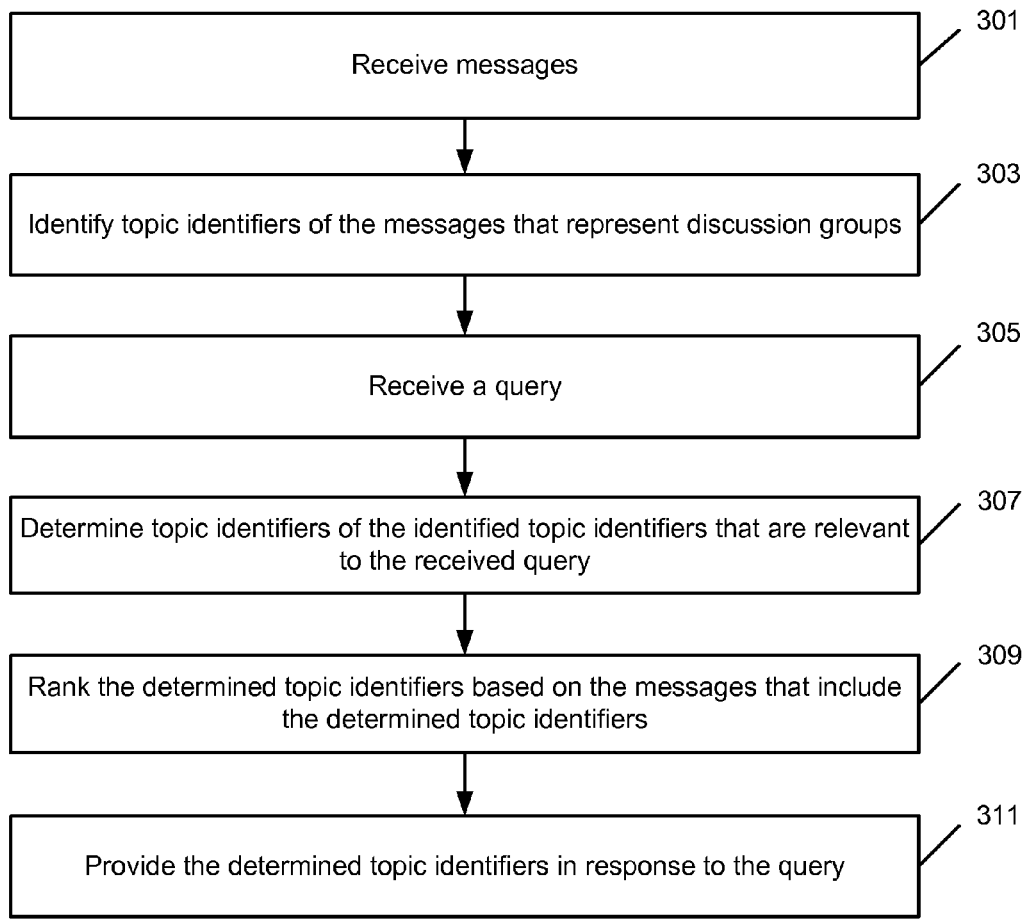
FIG. 3 is an operational flow of an implementation of a method for providing topic identifiers associated with discussion groups in response to a query.

FIG. 3 is an operational flow of an implementation of a method 300 for providing topic identifiers associated with discussion groups in response to a query. The method 300 may be implemented by the discussion group engine 180, for example.

A plurality of messages are received at 301. The plurality of messages 173 may be received by the discussion group engine 180 from the message service 170. Each message 173 may include a topic identifier, such as a hashtag, for example. Each message 173 may further be associated with an author and a date that the message was generated.

Topic identifiers that represent discussion groups are identified at 303. The topic identifiers that represent discussion groups may be identified by the discussion group identifier 210 of the discussion group engine 180.

A query is received at 305. The query 112 may be received by the discussion group engine 180 from a client 110. The query 112 may include one or more terms. The query 112 may be a request to identify topic identifiers associated with discussion groups that are relevant to the query 112.

Topic identifiers that are relevant to the received query are determined at 307. The topic identifiers may be determined by the discussion group engine 180 by determining topic identifiers that include one or more terms of the query 112. Alternatively or additionally, the discussion group engine 180 may determine that a topic identifier is relevant if some number of its associated messages 173 include one or more terms of the query 112. Other methods for determining relevant topic identifiers may be used.

The determined topic identifiers are ranked based on the messages that include the determined topic identifiers at 309. The determined topic identifiers may be ranked by the discussion group engine 180 using the group reference model using one or more of authority scores, preference scores and teleport scores computed based on the messages 173 associated with the topic identifiers.

The determined topic identifiers are provided at 311. The determined topic identifiers may be provided by the discussion group engine 180 according to the ranking by the discussion group engine 180 as the results 130.

Figure 4:
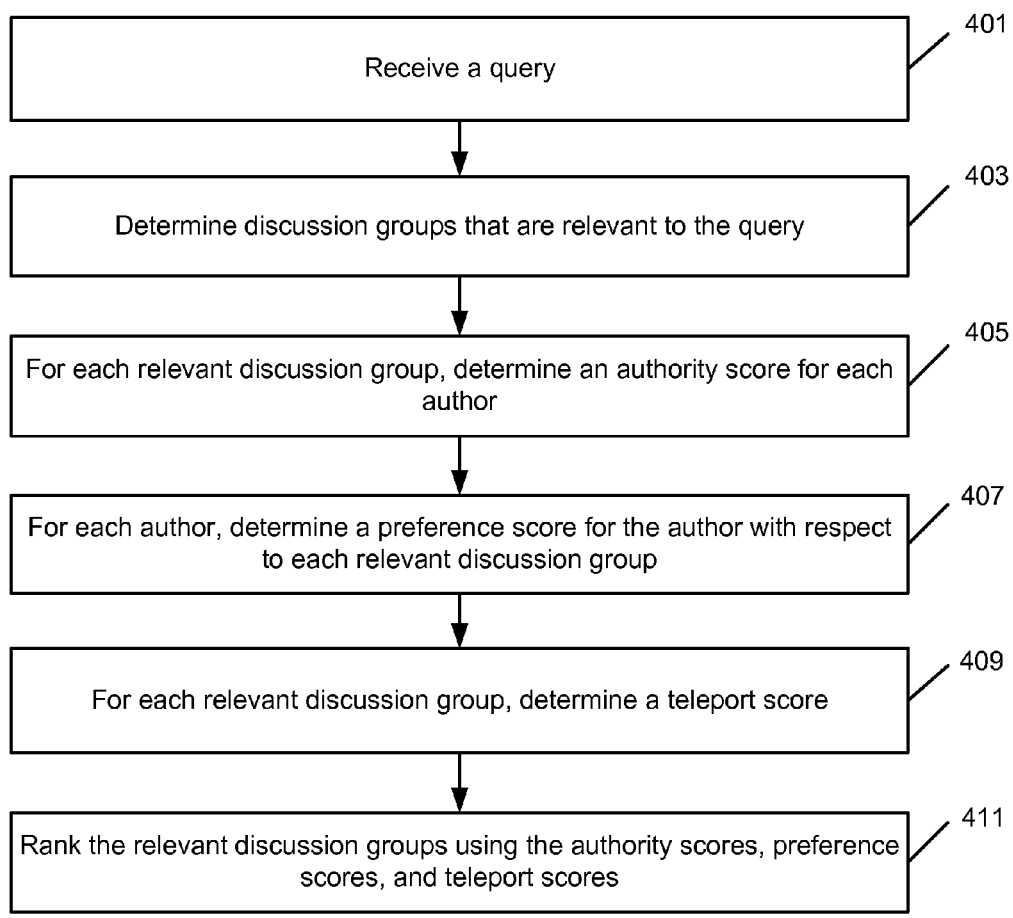
FIG. 4 is an operational flow of an implementation of a method for ranking discussion groups.

FIG. 4 is an operational flow of an implementation of a method 400 for ranking discussion groups. The method 400 may be implemented by the discussion group engine 180, for example. A query is received at 401. The query 112 may be received by the discussion group engine 180 from a client 110. The query 112 may include one or more terms. The query 112 may be a request to identify discussion groups that are relevant to the query 112.

A plurality of discussion groups that are relevant to the query is determined at 403. The relevant discussion groups may be determined by the discussion group engine 180 using one or both of the messages or topic identifiers associated with the discussion groups.

For each discussion group, an authority score is determined for each author at 405. The authority score for each author associated with a relevant discussion group may be determined by the authority score engine 220. Depending on the implementation, the authority score for an author may be determined using some or all of the number of followers that the author has, the number of messages that the author generated in the discussion group, or the number of replies that are associated with the author. Other methods may be used. The determined authority scores may be stored by the authority score engine 220 as the authority data 225, for example.

For each author, a preference score for the author with respect to each relevant discussion group is determined at 407. The preference score for each relevant discussion group for an author may be determined by the preference score engine 230. Depending on the implementation, the preference score for each relevant discussion group may be determined based on the attendance of the author with respect to each of the relevant discussion groups. Alternatively, or additionally the preference scores for the relevant discussion groups may be determined based on how many messages 173 that the author generates for each of the relevant discussion groups. Other methods may be used. The determined preference scores may be stored by the preference score engine 230 as the preference data 235, for example.

For each relevant discussion group, a teleport score is determined at 409. The teleport score for each relevant discussion group may be determined by the teleport score engine 240. Depending on the implementations, the teleport score for a relevant discussion group may be determined based on a number of messages 173 associated with the relevant discussion group that are relevant to the query 112. For example, the teleport score may be a ratio of the relevant messages 173 associated with the discussion group to a total number of messages 173 associated with the discussion group. Other methods may be used. The determined teleport scores may be stored by the teleport score engine 240 as the teleport data 245, for example.

The relevant discussion groups are ranked using the authority scores, the preference scores, and the teleport scores at 411. The relevant discussion groups may be ranked by the discussion group engine 180 using a Markov process to generate a stationary distribution using the authority scores, the preference scores, and the teleport scores, and ranking the relevant discussion groups using the generated stationary distribution.

Figure 5:
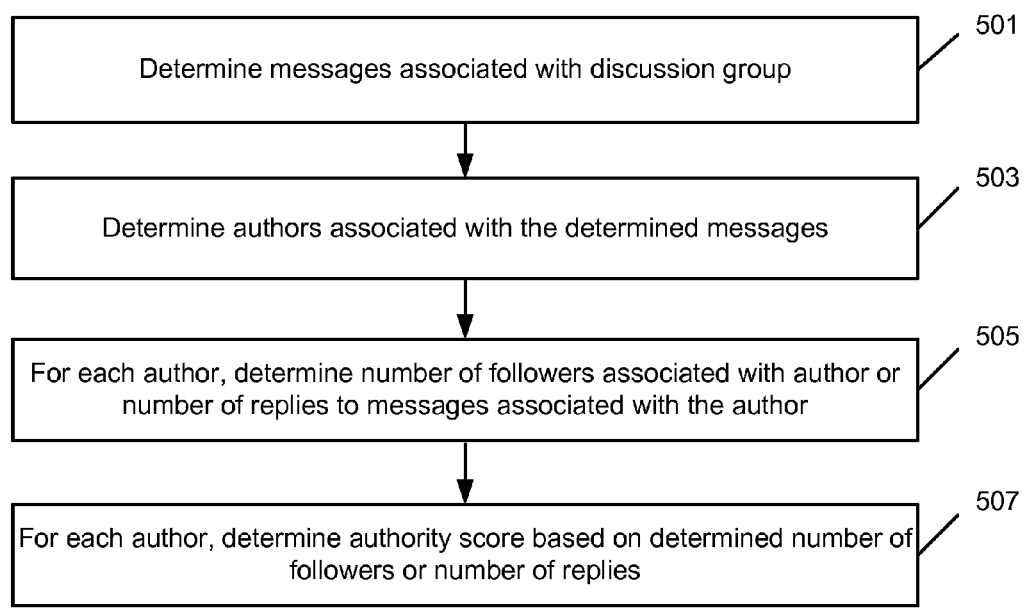
FIG. 5 is an operational flow of an implementation of a method for determining authority scores for authors associated with a discussion group of a set of relevant discussion groups.

FIG. 5 is an operational flow of an implementation of a method 500 for determining authority scores for authors associated with a discussion group of a set of relevant discussion groups. The method 500 may be implemented by the authority score engine 220 of the discussion group engine 180, for example.

Messages associated with a discussion group are determined at 501. The messages may be determined by the authority score engine 220 by determining messages 173 that include a topic identifier associated with the discussion group. The topic identifier may be a hashtag, for example. Other topic identifiers may be used.

Authors associated with the messages are determined at 503. The authors may be determined by the authority score engine 220 using the messages 173 associated with the discussion group. Each message 173 may have an associated author, and the authority score engine 220 may compile a list of authors from the determined messages 173 that are associated with the discussion group.

For each author, a number of followers associated with the author or a number of replies to messages associated with the author are determined at 505. The number of followers and/or the number of replies may be determined by the authority score engine 220. With respect to the number of followers, the authority score engine 220 may determine the number based on a profile page or other account information associated with the author in the message service 170. With respect to the number of replies associated with the author, the authority score engine 220 may determine the number of replies based on information provided by the messaging service 170, or by parsing the messages 173 associated with the discussion group for a sequence of one or more characters followed by the user name of the author. In some implementations, the sequence of one or more character is "@" followed by the user name of the author.

For each author, an authority score is determined based on the determined number of followers or the determined number of replies at 507. The authority score may be determined by the authority score engine 220.

Figure 6:
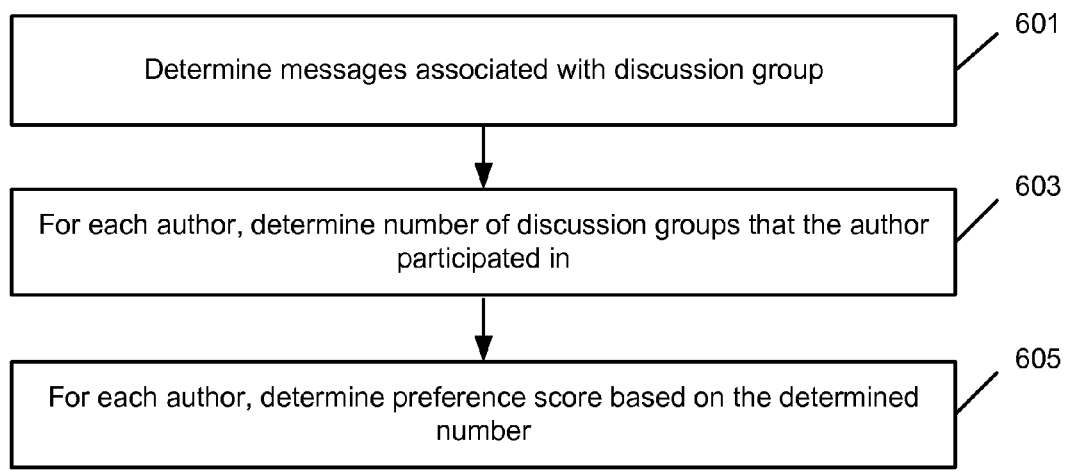
FIG. 6 is an operational flow of an implementation of a method for determining preference scores for authors with respect to discussion groups.

FIG. 6 is an operational flow of an implementation of a method 600 for determining preference scores for authors with respect to discussion groups. The method 600 may be implemented by the preference score engine 230, for example. Messages associated with a discussion group are determined at 601. The messages 173 may be determined by the preference score engine 230 by determining messages 173 that include a topic identifier associated with the discussion group. The topic identifier may be a hashtag, for example. Other topic identifiers may be used.

For each author, a number of discussion groups that the author participated in is determined based on the dates associated with the messages at 603. The number may be determined by the preference score engine 230. Depending on the implementation, the number of discussion groups may be determined from information provided by the message service 170, or may be determined based on the messages 173 associated with the author in the discussion group. For example, a date associated with each occurrence of the discussion group may be compared with dates associated with messages 173 generated by the author to determine how many of the discussion groups that the author participated in.

For each author, a preference score is determined based on the determined number at 605. The preference score for each author for the discussion group may be proportional to the number of occurrences of the discussion group that the author participated in. Across all relevant discussion groups, the combined preference scores generated for an author may be equal to one.

Figure 7:
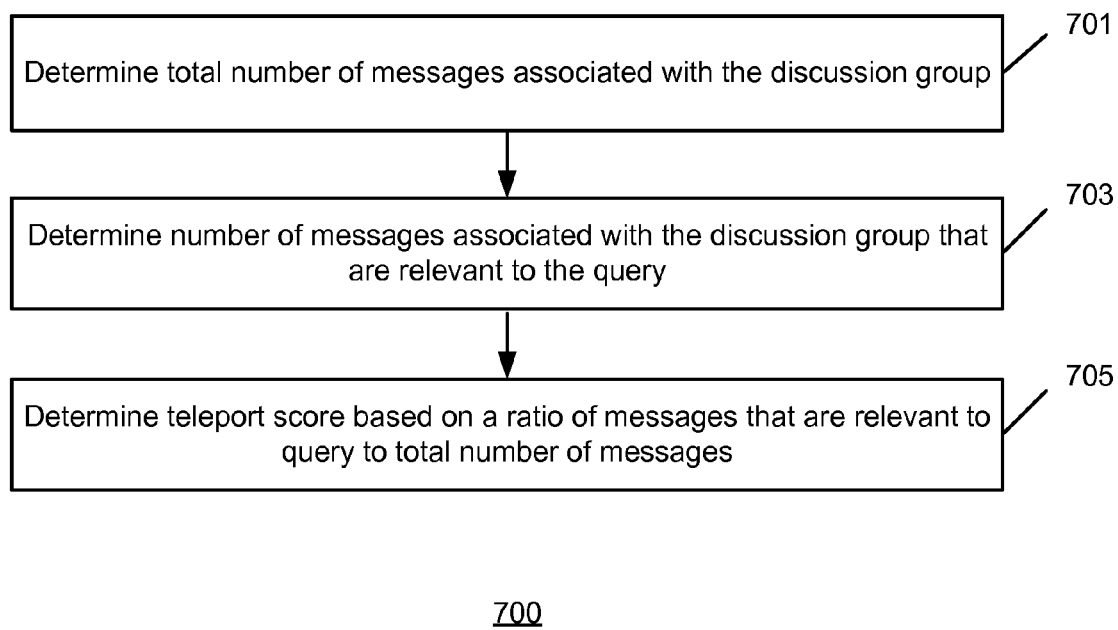
FIG. 7 is an operational flow of an implementation of a method for determining a teleport score for a discussion group.

FIG. 7 is an operational flow of an implementation of a method 700 for determining a teleport score for a discussion group. The method 700 may be implemented by the teleport score engine 240, for example.

A total number of messages associated the discussion group is determined at 701. The total number of messages 173 associated with the discussion group may be determined by the teleport score engine 240 using the topic identifier associated with the discussion group. For example, the teleport score engine 240 may count each message 173 that includes the topic identifier associated with the discussion group.

A number of messages associated with the discussion group that are relevant to a received query is determined at 703. The number of messages 173 that are relevant to the query 112 may be determined by the teleport score engine 240. The number of messages 173 that are relevant to the query 112 may be determined by searching for one or more terms of the query 112 in the messages 173 that also include the topic identifier associated with the discussion group.

A teleport score is determined for the discussion group based on a ratio of the messages that are relevant to the query to the total number of messages at 705. The ratio may be determined by the teleport score engine 240. Other methods for determining a teleport score may be used.

Figure 8:
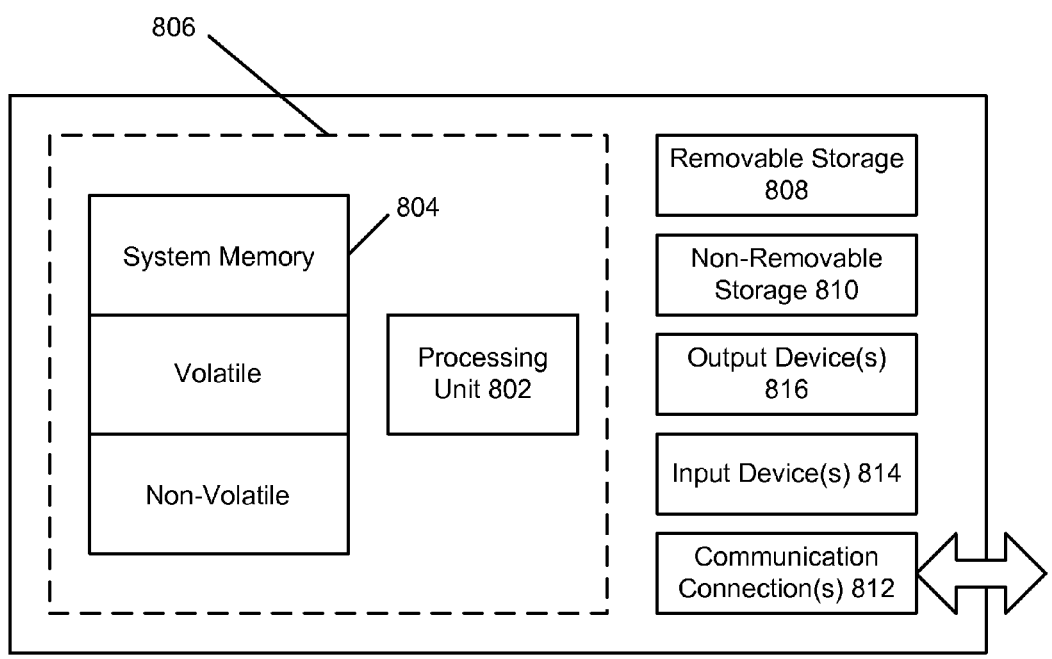
FIG. 8 shows an exemplary computing environment in which example embodiments and aspects may be implemented.

FIG. 8 shows an exemplary computing environment in which example embodiments and aspects may be implemented. The computing device environment is only one example of a suitable computing environment and is not intended to suggest any limitation as to the scope of use or functionality.

Numerous other general purpose or special purpose computing devices environments or configurations may be used. Examples of well-known computing devices, environments, and/or configurations that may be suitable for use include, but are not limited to, personal computers, server computers, handheld or laptop devices, multiprocessor systems, microprocessor-based systems, network personal computers (PCs), minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 8, an exemplary system for implementing aspects described herein includes a computing device, such as computing device 800. In its most basic configuration, computing device 800 typically includes at least one processing unit 802 and memory 804. Depending on the exact configuration and type of computing device, memory 804 may be volatile (such as random access memory (RAM)), non-volatile (such as read-only memory (ROM), flash memory, etc.), or some combination of the two. This most basic configuration is illustrated in FIG. 8 by dashed line 806.

Computing device 800 may have additional features/functionality. For example, computing device 800 may include additional storage (removable and/or non-removable) including, but not limited to, magnetic or optical disks or tape. Such additional storage is illustrated in FIG. 8 by removable storage 808 and non-removable storage 810.

Computing device 800 typically includes a variety of computer readable media. Computer readable media can be any available media that can be accessed by the device 800 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 804, removable storage 808, and non-removable storage 810 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 800. Any such computer storage media may be part of computing device 800.

Computing device 800 may contain communication connection(s) 812 that allow the device to communicate with other devices. Computing device 800 may also have input device(s) 814 such as a keyboard, mouse, pen, voice input device, touch input device, etc. Output device(s) 816 such as a display, speakers, printer, etc. may also be included. All these devices are well known in the art and need not be discussed at length here.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method comprising:
   receiving a query by a computing device;
   determining a plurality of discussion groups that are relevant to the query by the computing device, wherein each discussion group is associated with a plurality of messages and each message is associated with an author;
   for each discussion group of the plurality of discussion groups, determining an authority score for each author associated with a message of the discussion group by the computing device;
   for each author associated with a message, determining a preference score for the author for each discussion group of the plurality of discussion groups by the computing device, wherein determining the preference score comprises determining the preference score based on a proportion of a number of occurrences of the discussion group that the author participated in to a total number of occurrences of the plurality of discussion groups that the author participated in; and
   ranking the discussion groups of the plurality of discussion groups using the preference scores and the authority scores by the computing device, wherein using the preference scores and the authority scores comprises generating a stationary distribution of a Markov process for the query and the discussion groups using the preference scores and the authority scores, and wherein ranking the discussion groups comprises ranking the discussion groups using the generated stationary distribution.

2. The method of claim 1, further comprising providing the ranked discussion groups in response to the query.

3. The method of claim 1, wherein determining an authority score for an author comprises determining a number of followers associated with the author and determining the authority score based on the determined number of followers.

4. The method of claim 1, wherein determining an authority score for an author comprises determining a number of times that the author is referenced in a message of the plurality of messages and determining the authority score based on the determined number of times.

5. The method of claim 1, wherein determining an authority score for an author comprises determining a number of direct replies associated with the author and determining the authority score based on the determined number of direct replies.

6. The method of claim 1, wherein the authority score for an author may be determined based on one or more of noun frequency or mention weights.

7. The method of claim 1, wherein determining a preference score for an author for a discussion group comprises:
   determining a number of occurrences of the discussion group that the author participated in; and
   determining the preference score based on the determined number.

8. The method of claim 1, wherein determining a preference score for an author comprises determined a transition probability matrix and determining the preference score based on the transition probability matrix.

9. The method of claim 1, further comprising:
   for each group of the plurality of discussion groups, determining a teleport score; and ranking the discussion groups of the plurality of discussion groups using a stationary distribution generated by a Markov process on the preference scores, the authority scores, and the teleport scores.

10. The method of claim 9, wherein determining a teleport score for a discussion group comprises:
determining a number of times that the query is relevant to a message associated with the discussion group; and
determining the teleport score based on the determined number of times.

11. The method of claim 1, wherein each discussion group is associated with a topic identifier and each message associated with a discussion group includes the topic identifier associated with the discussion group.

12. The method of claim 1, further comprising:
determining the number of occurrences of the discussion group that the author participated in; and
determining the total number of occurrences of the plurality of discussion groups that the author participated in.

13. A method comprising:
receiving a plurality of messages at a computing device, wherein each message includes a topic identifier and is associated with an author;
determining topic identifiers of the plurality of messages that represent discussion groups by the computing device;
receiving a query at the computing device;
determining topic identifiers of the determined topic identifiers that are relevant to the received query by the computing device;
ranking the determined topic identifiers based on the messages that include the determined topic identifiers by the computing device, wherein ranking the determined topic identifiers comprises:
for each determined topic identifier, determining an authority score for each author associated with a message that includes the topic identifier;
for each author associated with a message, determining a preference score for the author for each determined topic identifier using the messages associated with the author, wherein determining the preference score comprises determining the preference score based on a proportion of a number of occurrences of the discussion group that the author participated in to a total number of occurrences of the plurality of discussion groups that the author participated in; and
ranking the determined topic identifiers using the preference scores and the authority scores, wherein using the preference scores and the authority scores comprises generating a stationary distribution of a Markov process for the query and the discussion groups using the preference scores and the authority scores, and wherein ranking the discussion groups comprises ranking the discussion groups using the generated stationary distribution; and
providing the ranked determined topic identifiers in response to the query by the computing device.

14. The method of claim 13, wherein a topic identifier represents a discussion group if the messages that include the topic identifier are one or more of periodic, synchronous, or cohesive.

15. The method of claim 13, wherein determining an authority score for an author comprises determining a number of followers associated with the author and determining the authority score based on the determined number of followers.

16. The method of claim 13, wherein determining a preference score for an author for a topic identifier comprises:
determining a number of occurrences of the discussion group represented by the topic identifier that the author participated in; and
determining the preference score based on the determined number.

17. The method of claim 13, further comprising:
for each topic identifier, determining a teleport score; and
ranking determined topic identifiers using the preference scores, the authority scores, and the teleport score.

18. The method of claim 17, wherein determining a teleport score for a topic identifier comprises:
determining a number of times that the query is relevant to a message that includes the topic identifier; and
determining the teleport score based on the determined number of times.

19. A system comprising:
at least one computing device; and
a discussion group engine adapted to:
receive a query and a plurality of discussion groups that are relevant to the query, wherein each discussion group is associated with a plurality of messages and each message is associated with an author;
for each discussion group of the plurality of discussion groups, determine an authority score for each author associated with a message associated with the discussion group;
for each author associated with a message, determine a preference score for the author for each discussion group of the plurality of discussion groups, wherein determining the preference score comprises determining the preference score based on a proportion of a number of occurrences of the discussion group that the author participated in to a total number of occurrences of the plurality of discussion groups that the author participated in;
for each group of the plurality of discussion groups, determine a teleport score; and
rank the discussion groups of the plurality of discussion groups using the preference scores, the authority scores, and the teleport scores, wherein using the preference scores, the authority scores, and the teleport scores comprises generating a stationary distribution of a Markov process for the query and the discussion groups using the preference scores, the authority scores, and the teleport scores, and wherein ranking the discussion groups comprises ranking the discussion groups using the generated stationary distribution.

20. The system of claim 19, wherein the discussion group engine is further adapted to provide the ranked discussion groups in response to the received query.

* * * * *